US012757009B2

(12) United States Patent
Giess et al.

(10) Patent No.: US 12,757,009 B2
(45) Date of Patent: Oct. 6, 2026

(54) EUICC CUSTOMIZATION

(71) Applicant: EMnify GmbH, Würzburg (DE)

(72) Inventors: Martin Giess, Schwarzach am Main (DE); Frank Stöcker, Schwarzach (DE); Mario Bucci, Berlin (DE); Stefan Stührmann, Ferrel (PT)

(73) Assignee: EMNIFY GMBH, Würzburg (DE)

( * ) Notice: Subject to any disclaimer, the term of this patent is extended or adjusted under 35 U.S.C. 154(b) by 260 days.

(21) Appl. No.: 18/767,673

(22) Filed: Jul. 9, 2024

(65) Prior Publication Data

US 2026/0019800 A1 Jan. 15, 2026

(51) Int. Cl.
*H04W 8/20* (2009.01)

(52) U.S. Cl.
CPC .................................. *H04W 8/205* (2013.01)

(58) Field of Classification Search
CPC ......... H04W 8/205; H04W 8/18; H04W 8/20; H04W 8/22; H04W 8/24
See application file for complete search history.

(56) References Cited

U.S. PATENT DOCUMENTS 9,913,127 B1 3/2018 Polepalli
2013/0303122 A1 11/2013 Li et al.
2022/0167147 A1* 5/2022 Karimli ................... H04W 4/50
2023/0164541 A1* 5/2023 Ravikanti ............. H04W 8/183 455/558
2023/0171583 A1* 6/2023 Khanh .................... H04W 8/18 455/418
2024/0040495 A1* 2/2024 Pratt ..................... H04W 12/06
2024/0147212 A1* 5/2024 Halmann ................ H04W 8/18

FOREIGN PATENT DOCUMENTS

EP 3557896 A1 10/2019

OTHER PUBLICATIONS

Extended European Search Report issued May 27, 2024 in corresponding European Patent Application No. 24151715.0 (5 pages).

* cited by examiner

*Primary Examiner* — Christopher M Brandt
(74) *Attorney, Agent, or Firm* — Bookoff McAndrews PLLC

(57) ABSTRACT

A system for optimizing a SIM card profile, wherein the system include: a configuration unit, configured to receive user input, configure the system to optimize one or more parameters a logic executor unit, wherein the logic executor is configured to communicate with a subscriber database, a remote SIM provisioning platform, a mobile core network, and an artificial intelligence system; wherein the configuration unit configures the logic executor unit to retrieve a list of identifiers, that uniquely identify SIM cards belonging to the selected customer, from a subscriber database; retrieve SIM settings in accordance with the list of identifiers from a remote SIM provisioning platform; retrieve data including the selected parameter for the SIM cards identified by the list from a network; forward the retrieved SIM settings and the data to an artificial intelligence system; receive optimized SIM settings from the artificial intelligence system.

15 Claims, 3 Drawing Sheets

EUICC CUSTOMIZATION

The invention relates to the customization of eUICC (embedded universal integrated circuit cards). The universal integrated circuit card (UICC) is the smart card (integrated circuit card) used in mobile terminals in 2G (GSM), 3G (UMTS), 4G (LTE) and 5G networks. The UICC ensures the integrity and security of all kinds of personal data, and it typically holds a few hundred kilobytes. The official definition for UICC is found in ETSI TR 102 216, where it is defined as a "smart card that conforms to the specifications written and maintained by the ETSI Smart Card Platform project". In addition, the definition has a note that states that "UICC is neither an abbreviation nor an acronym". NIST SP 800-101 Rev. 1 and NIST Computer Security Resource Centre Glossary state that, "An UICC may be referred to as a SIM, USIM, RUIM or CSIM, and is used interchangeably with those terms", though this is an over-simplification. The primary component of an UICC is a SIM card.

The subscriber identity mobile (SIM) plays a crucial role in mobile networks, specifically since the inception of GSM and its related 3GPP variants (2-5G) with the main purpose to

- identify mobile subscribers
- authenticate mobile subscribers
- store of Information like network related settings and configurations.

The SIM profile (the stored information) for a specific SIM is generated at the time a new SIM card is provisioned by combining generic (e.g. default network settings such as the definition of the home network, a list of preferred networks (roaming partners), preferred radio access types and frequencies, allowed APNs) and personalized data (e.g. numbering resources such as the individual phone number (MSISDN), an individual PIN code, SIM credential such as the Key Identifier (Ki), which is the secret key on the SIM to authenticate against the network. This process is also known as personalization.

Once the SIM profile is ready, it is programmed on a physical IC chip, or since eUICC (eSIM) technology was introduced, it is downloaded to an IC chip pre-integrated on a mobile device.

During the lifetime of the SIM—when it is actively used in a device—the stored information on the SIM profile can be updated over the air (OTA). This option can be used by the mobile network operator to adopt the SIM profile to their business or technical requirements, e.g. to enable/disable new roaming partners or introduce new radio access types. Usually this is done on a "global" basis, so settings are applied to all subscribers of a certain operator in the same way.

As the generic part of the data is the same for all produced SIM profiles, they only differ in the personalized part of the configuration and default network settings are all the same, though they greatly can influence network performance and behaviour. For human subscribers it is desirable to keep the settings over the whole subscribers base the same to provide consistent service and periodically adopt the whole population of devices to new requirements, primarily because they all share exactly the same use case (e.g. web browsing, video streaming, high quality voice calls).

In the context of the Internet of Things (IoT) each use case can vary very much in requirements and target key performance indicators (KPIs), for example requirements for low-latency/high bandwidth vs. power efficiency/security/network friendliness.

Though these KPIs can be greatly influenced by settings on the SIM and would require custom settings to be provisioned on a narrowly selected group of SIMs or even individual SIMs. The cardinality of different settings quickly explodes with possible permutations of device hardware and software versions, modem versions, SIM versions and used radio access types, for example 2-5G, narrow band IoT (NB-IoT), LTE-m, non-terrestrial networks (NTN). These components are subject to permanent rollouts of new software versions.

Mobile operators are struggling to understand each of that individual use cases, as also changes per individual customers are tedious to prepare manually and monitor, as the customer typically has no information what the optimal settings potentially would be for the individual use case, as important KPIs, that can only be retrieved from network components inside the mobile network, are required for the correct assessment and very deep under-standing of interactions of different components.

Therefore, it would be desirable to implement a method to automatically monitor one or more KPIs, understand the current SIM settings of the device, in particular the network settings, automatically apply changes to the settings, monitor improvements on KPIs and react on them. The goal is a process of a continuous improvement cycle that can scale to dozens of different individual use cases.

The above problem is solved in accordance with a system, a method and a computer program for optimizing SIM settings.

The system for optimizing a SIM card profile comprises a configuration unit, configured to receive user input, configure the system to optimize one or more parameters, a logic executor unit, wherein the logic executor is configured to communicate with a subscriber database, a remote SIM provisioning platform, a mobile core network and an artificial intelligence system; wherein the configuration unit configures the logic executor unit to retrieve a list of identifiers, that uniquely identify SIM cards belonging to the selected customer, from a subscriber database, retrieve SIM settings in accordance with the list of identifiers from a remote SIM provisioning platform, retrieve data comprising the selected parameter for the SIM cards identified by the list from a network, forward the retrieved SIM settings and the data to an artificial intelligence system, receive optimized SIM settings from the artificial intelligence system, instructing the remote SIM provisioning system to generate new SIM profiles based on the optimized SIM settings and to deploy the SIM profiles.

A SIM card profile is a file system comprising files, for example elementary files as defined by 3GPP TS 31.102. Different parameters that are stored on the file system of the SIM and are read and applied by the user equipment (UE) carrying the SIM card, for example a mobile terminal or mobile modem. Each SIM setting corresponds to a file stored on the SIM card. The SIM card may be an eUICC (eSIM). The files associated with the settings are part of the file system and stored on the SIM card. The content of the SIM card is the SIM profile. The SIM profile comprises the SIM settings and accordingly, the files corresponding to the respective settings. In the context of this disclosure each SIM setting corresponds to a parameter SIM card settings may be an operator's profile, for example, the definition of the home network or a service provider name (SPN) to be displayed on the UE. Typically, a default operator profile is stored during the manufacturing process. The default settings allow the SIM card to operate with a default configuration. The default operator's profile may be re-placed over-the-air.

A typical network environment, for example a mobile network operator environment, comprises a subscriber database that identifies customers and their related SIM cards. If the SIM is using eUICC technology (eSIM), an unique eUICC identifier (EID) is allocated to identify the respective SIM card. The EID allows to identify the SIM card and the customer the SIM card is assigned to.

A network environment further comprises a business support system (BSS). The BSS system allows to manage customer data, issued SIM cards, tariff and data plans. The BSS may be accessible via an application programming interface. In particular the data stored within a subscriber database is managed by a BSS running on the subscriber database.

Mobile network operators use a remote SIM provisioning system (RSP) following an architecture as defined in GSMA SGP.21 to manage their fleet of eUICCs (eSIMs) and their profiles. Internally the RSP includes two main functions: the Subscription Manager Data Preparation (SM-DP) and SM-SR (Subscription Manager Secure Routing). The remote SIM provisioning system allows to generate, personalize and deploy SIM profiles onto eUICC SIMs including the option to deploy new SIM profiles over-the-air (OTA). The remote SIM provisioning system may be accessible via an application programming interface (API).

The system for optimizing a SIM card profile communicates with the subscriber database, the remote SIM provisioning system, the core network and an artificial intelligence system. The system for optimizing a SIM card profile may communicate with the different network entities via respective application programming interfaces (APIs).

The system may be configured in accordance with user input. The user may provide input via an API of a configuration unit of the system. The configuration system may configure the system in accordance with the user input. The system may comprise a logic executor unit which executes the processes performed by the system. The configuration system may configure the logic executor unit to perform the processes in accordance with or based on the user input.

The user input may comprise information on a customer for whom the SIM cards should be optimized. In particular, the SIM settings of the SIM profiles of the SIM cards of the customer should be optimized. The user may select a customer and may provide the system with the respective information. The configuration unit may configure the system to optimize the SIM cards of the selected customer. The user input may comprise information regarding one or more parameters with respect to which the SIM profiles and the respective SIM settings associated with the customer should be optimized. The parameters may considered as key-performance indicators (KPIs). The KPIs may be parameters for requirements for low-latency/high bandwidth vs. power efficiency/security/network friendliness. For example, the parameters may be the number of successful/failed network attach attempts, the number of successful/failed attempts to open a data session, the duration of data sessions, the data sessions with no payload transmitted, information on the radio access type used or information which radio access network (roaming partner) was used for a data session.

The user input may comprise information on one or more SIM settings that should be modified or optimized in order to optimize one or more selected parameters. The configuration system may configure the system to optimize the SIM profiles belonging to the SIM cards of the selected customer. In particular, the configuration unit may configure the system based on user input to optimize the selected settings of the SIM profiles of the SIM cards of the selected customer, in order to optimize the one or more selected parameters. The SIM settings to be optimized may be network settings of the SIM card. The configuration unit may read the configuration provided by a user and may configure the system accordingly. The system may communicate with a subscriber database.

The system may retrieve a list of identifiers that uniquely identify the SIM cards belonging to the selected customer from a subscriber database. The identifiers may be eUICC identifiers (eIDs). The subscriber database may run a business support system (BSS). The system may retrieve the list of identifiers that uniquely identify the SIM cards of the selected customer via an API of the BSS. In accordance with a request from the system, the subscriber database provides the list. The system may poll the list from the subscriber database. Therefore, the list of identifiers may identify a set of eUICCs of the selected customer. Accordingly, the list is associated with the selected customer and comprises the eIDs of the SIM cards belonging to the customer. The list may only contain one identifier. For example, in case only one SIM card is associated or belongs to the selected customer.

The user may also select more than one customer. The list in such case comprises the identifiers of the SIM cards belonging to all selected customers. The SIM settings for all SIM cards belonging to all selected customers are accordingly optimized.

In a next step, the system queries a remote SIM provisioning system for the SIM profiles of the SIM cards identified by the identifiers of the list. The remote SIM provisioning system may be a remote SIM provisioning system as defined by GSMA SGP.21, which is a system to generate, personalize, and deploy eUICC SIM profiles. The system provides the remote SIM provisioning system with the retrieved identifiers or the list and queries the respective SIM profiles comprising the SIM settings from the remote SIM provisioning system. The remote SIM provisioning system provides the SIM profiles to the system. In particular, the system retrieves the SIM profiles of the set of eIDs corresponding to the previously retrieved list. The remote SIM provisioning system may provide the SIM settings of the SIM profiles of the SIM cards identified by the list identifying the SIM cards of the selected customer.

The system may further communicate with the core network. In particular, the system may communicate with a monitoring system of the core network, for example the home subscriber server (HSS) or the packet gateway (PGW). The system is configured to retrieve the one or more selected parameter, which is considered a key-performance indicator, for each of the SIM profiles to be optimized, i.e. the SIM profiles corresponding to the identifiers of the list corresponding to the identifiers of the SIM cards belonging to the selected customer. The system interacts with the monitoring system of the core network elements, for example, HSS and PGW, to retrieve parameters or KPIs of the specific SIM, i.e. the SIMs belonging to the selected customer, to be optimized. Thus, the system retrieves the value of the selected one or more parameters for each of the SIM profiles and associated SIM cards of the selected customer. The data retrieved from the monitoring system of the core network or the core network comprises the selected one or more parameter for the SIM cards belonging to the customer. The data may comprise the selected one or more parameter and the associated eiD. Accordingly, the data comprises the selected one or more parameter for each SIM card of the customer and allows to determine the selected one or more parameters for each SIM card of the selected customer.

The data related to the value of the selected one or more parameters for each of the SIM profiles and associated SIM cards of the selected customer is transmitted by the system to an artificial intelligence system. The artificial intelligence system may be a statistical model or a machine learning model. The system also provides the SIM settings retrieved from the remote SIM provisioning system for the SIM cards identified by the list of SIM cards belonging to the selected customer to the machine learning system or statistical model.

The machine learning model may particularly be trained for the use case of the selected one or more parameters and the selected one or more SIM settings. Accordingly, the machine learning system may provide modified SIM settings to optimize the one or more selected parameters.

The artificial intelligence system returns optimized SIM settings. In particular, the artificial intelligence system provides file contents, wherein the file corresponds to a file corresponding to a SIM setting. For example, with respect to the previous version, which was retrieved by the system, a certain value may be increased or decreased or certain values may be added, removed or values may be reordered in a list of the file corresponding to the selected setting. In case of more than one selected setting is to be optimized with respect to one or more parameters, the artificial intelligence system returns one or more files corresponding to the one or more settings.

Preferably, the artificial intelligence system provides optimized settings for each SIM profile or each eID. Accordingly, the system optimizes the SIM settings for each SIM profile belonging to a SIM card of the selected customer. Subsequently, the system provides the modified or optimized SIM settings for each eID to the remote SIM provisioning system and instructs the remote SIM provisioning system to generate new profiles with respect to the eIDs of the list identifying the SIM cards belonging to the selected customer. Accordingly, the optimization is based on the new SIM settings provided by the artificial intelligence system.

Preferably, the remote SIM provisioning platform overwrites the settings which were optimized with the modified settings, e.g. the modified files, to generate new profiles for the SIM cards belonging to the selected customer. The system further may instruct the remote SIM provisioning platform to roll out or deploy the generated SIM profiles to the SIM cards associated with the eID corresponding to the respective SIM profile. The system may instruct the remote SIM provisioning platform via an API of the remote SIM provisioning platform. The remote SIM provisioning platform may roll out the profiles over the air (OTA).

After completion of the optimization process the system may start the process again. Performing multiple optimization cycles causes the SIM card to periodically receive new and optimized SIM settings. For each iteration of the optimization process the one or more selected parameters provide a measure for the impact of the changes caused by the modified SIM settings.

The system may therefore run a permanent optimization cycle to adopt and optimize SIM card settings based on the one or more parameters. In other words, one or more parameters of the network are optimized by optimizing the SIM settings. Accordingly, the SIM settings are optimized to optimize the selected parameter, for example a network parameter or a key-performance indicator. Therefore, the system allows monitor one or more parameters or key performance indicators such as power efficiency/security/network friendliness of devices in the network and the system allows to adjust the SIM settings in order to optimize the selected key performance indicators. The system, therefore, allows to optimize the behaviour and the efficiency of SIM cards of a selected user with respect to a key-performance indicator, which may be a parameter of the network or a parameter of the device with respect to a network or a parameter of the device.

Preferably, the logic executor communicates with the subscriber database via an API of a business support system, BSS. The logic executor unit communicates with the remote SIM provisioning system via an API. The logic executor unit communicates with the core network via an API. The logic executor unit communicates with the artificial intelligence system via an API. Using APIs for communication allows for a versatile system, which allows to communicate with every system providing a compatible API.

Preferably, the system for optimizing SIM profiles comprises the artificial intelligence system. The artificial intelligence system optimizes the SIM settings with respect to one or more selected parameters. The artificial intelligence system may therefore be trained for the particular use case, for example, the combination of the one or more parameters and the one or more SIM settings. In case the artificial intelligence system is part of the system for optimizing SIM card profiles, the training process is under the control of the system. Thus, the system may provide the training data. The system may also facilitate the training. The training may be based on user input. In particular, the configuration unit may configure and/or train the artificial intelligence system based on user input. Thus, the training may be under the control of the user. The user may provide the training data and may control the training process. Therefore, the artificial intelligence system may be tailored by the user to perform a particular task, for example a particular use case regarding one or more selected parameters and one or more selected SIM settings. Therefore, the system may be tailored and optimized for the optimization of SIM card profiles providing a more efficient system for optimizing SIM card profiles.

Preferably, the artificial intelligence system is a machine learning system configured to optimize the selected one or more parameters, in particular, wherein the artificial machine learning system is a statistical model. Using a statistical model or a machine learning system may provide a particular efficient and accurate way to determine optimized SIM settings. In particular, using a machine learning model allows to control the accuracy by providing the training data. By providing highly accurate training data or by controlling the amount of training data, the user controls the accuracy of the system. Thus, the system may be optimized to provide accurate results and simultaneously efficiently utilize the training re-sources. For example, by aborting the training in case a sufficient accuracy has been determined. The required accuracy may be set by the user. The training may also be aborted by the user. For example, in case the user determines that the system is trained sufficiently to provide a specific accuracy.

Preferably, the artificial intelligence system is trained for the selected one or more parameters and one or more selected SIM settings. Providing training for the particular combination which is selected by the user allows for a more efficient and accurate system.

Preferably, the artificial intelligence system is configured based on user input received at the configuration unit of the system.

Preferably, the system for optimizing the SIM card profile further comprises a data visualization unit, wherein the data visualization unit provides visualized data to the user, wherein the visualized data comprises information on the selected parameters and/or the customer and/or the selected SIM settings; the visualized data may further comprise the list of SIM cards belonging to the customer. The data visualization unit allows the user to interact with the system, for example by reviewing the selected parameter. In particular, the user may review the selected parameters retrieved by the system from the core network for each of the SIM cards belonging to the selected user. The user may therefore review the development of the parameters with each optimization cycle of the system. The user may determine whether the parameters develop differently for different SIM cards. In dependence with this determination the user may abort the optimization process, for example to select a different parameter in case the parameters develop differently for each SIM card, e.g. in case the one or more parameters diverge for the different SIM cards.

Preferably, the data visualization unit provides visualized data to a client device, comprising a graphical user interface for displaying the visualized data to the user, in particular, allowing the user to inspect the changes performed on the SIM card content via the graphical user interface. Thus, the system allows the user to identify in an efficient manner the changes caused by the optimization process, allowing the user to provide user input to modify the selection of parameters of SIM settings, for example in case the observed changes indicate that the optimization fails.

The method for optimizing a SIM profile comprises the steps of selecting a customer, one or more parameters based on which the SIM card profile shall be optimized, and one or more SIM card settings to be optimized, retrieving a list of identifiers, that uniquely identify SIM cards belonging to the selected customer, from a subscriber database, retrieving SIM settings in accordance with the list of identifiers from a remote SIM provisioning platform, retrieving data comprising the selected one or more parameters for the SIM cards identified by the list from a network, forwarding the retrieved SIM settings and the data to an artificial intelligence system, receiving optimized SIM settings from the artificial intelligence system, instructing the remote SIM provisioning system to generate new SIM profiles based on the optimized SIM settings and to deploy the SIM profiles to the selected SIM cards.

The method optimizes SIM profiles by selecting one or more parameters which may be a network parameter related to a SIM card, for example power consumption, accessed bandwidth, and consumed bandwidth. The parameter may also be the number of successful/failed network attach attempts, the number of successful/failed attempts to open a data session, the duration of data sessions, the number of data sessions with no payload trans-mitted, information on the radio access type used, information which radio access network (roaming partner) was used for a data session. A user may further select one or more SIM settings for optimization, wherein the SIM settings are modified in order to optimize the selected one or more parameters, for example, the SIM settings may be the network settings. The method optimizes the network settings in order to optimize the parameter which may be depending on the selected network settings provided by the SIM settings.

Subsequently, the eIDs, which are the eUICC identifiers that uniquely identify SIM cards of the selected customer of the SIM cards belonging to a customer, are retrieved from a subscriber database. A list may be generated containing the eIDs of the SIM cards belonging to the selected customers. The list comprises a set of eIDs belonging to the customer. Accordingly, the list is associated with the customer, i.e. the list contains the eIDs of the SIM card of the customer.

The list may be provided to a remote SIM provisioning platform. The list identifies a group of SIM cards belonging to the selected customer. The list corresponds to a set of eIDs of eUICCs belonging to the selected customer. The remote SIM provisioning platform retrieves the SIM profile for each SIM profile associated with an eID of the list. The SIM profile includes all details of the information content, for example files, on the eUICC. The remote SIM provisioning platform provides the SIM settings for each of the SIM cards identified by the list associated with the customer.

The method further includes retrieving data comprising the selected one or more parameters for the SIM cards identified by the list from a core network. The core network is queried for data related to the one or more parameters or the parameter itself with respect to each SIM card identified by the list of eID associated with the selected customer. The data may be provided by a monitoring systems of the core network, for example the HSS and/or PGW. The retrieved data comprises the selected one or more parameters for each of the SIM cards identified by the list associated with the selected customer. The data is provided to an artificial intelligence system. The SIM settings are retrieved from the remote SIM provisioning platform. The retrieved SIM settings are provided to the artificial intelligence system together with the retrieved data related to the one or more parameters or the parameter itself with respect to each SIM card. The selected SIM settings are provided to the artificial intelligence system in order to provide the artificial intelligence system with the information which of the SIM settings shall be optimized. In other words, the artificial intelligence system is instructed to optimize the selected SIM settings. Accordingly, the artificial intelligence system optimizes the selected SIM settings of the SIM settings for each SIM card identified by the eiD of the list associated with the customer. The optimized SIM settings are provided to the optimization system. The method includes providing the optimized SIM settings for each SIM card identified by the eID of the list to the remote SIM provisioning platform. The method further includes instructing the remote SIM provisioning platform to generate new SIM profiles based on the optimized SIM settings and to deploy the new SIM profiles. Accordingly, the remote SIM provisioning platform replaces the selected SIM settings with the optimized SIM settings, generates new SIM profiles and deploys the new SIM profiles to the SIM cards associated with the SIM profiles.

The method may be repeated multiple times. Multiple optimization cycles allow to update the SIM profiles multiple times and to provide improved settings. For each cycle the impact of the optimization, i.e. the modification to the network settings of the SIM settings, can be measured by using the selected parameters. For example, the change of the selected one or more parameters may provide a measure for the impact of the optimization of the SIM settings.

Contrary to known systems, the method modifies the network settings of the SIM settings, which is contrary to the typically approach, wherein the generic or network part of the SIM settings is the same for all produced SIM profiles and respective cards and the SIM profiles only differ in the personalized part. The reason being, that for normal applications it is desirable to keep the settings over the whole subscribers base the same to provide consistent service and periodically adopt the whole population of devices to new requirements, primarily because they all share exactly the same use case (e.g. web browsing, video streaming, high quality voice calls). However, the underlying generic network SIM settings can greatly influence network performance and behaviour of the network. Therefore, the method provides a solution that allows to adapt the network settings of the SIM settings in order to provide an optimized behaviour with respect to selected key performance indicator(s), i.e. the selected one or more parameters.

Preferably, the one or more parameters include a number of successful network access attempts, a number of failed network access attempts, a number of successful attempts to open a data session, a number of failed attempts to open a data session, the duration of a data session, the number of data sessions with no payload transmitted, information on the radio access type used, information which radio access network was used for a data session.

Preferably, the SIM card settings are network settings. This allows to optimize configuration of the SIM card with respect to the network, instead of maintaining the same network configuration for all SIM cards.

Preferably, the SIM card settings include the order of public land mobile networks (PLMN) or the most available frequencies in used area.

Preferably, the SIM profile is a profile of an eUICC.

Preferably, the method is repeated multiple times. Preferably, the method runs in a permanent cycle.

Preferably, the method includes receiving an user input, specifying the customer and one or more parameters based on which the SIM card profile shall be optimized and one or more SIM card settings to be optimized.

Preferably, the user input is received by a configuration unit of a system for optimizing a SIM card profile and the method further comprises the step of configuring, by the configuration unit, the system for optimizing a SIM card profile based on the received user input.

Therefore, the method allows to configure the system performing the method and the parameters related to the method to be configured by a user, allowing the user to adapt the method to the individual need of the present use case.

The computer program comprises instructions which, when the program is executed by a processor, cause the processor to carry out above disclosed method. In particular, the computer program comprises instructions which, when the program is executed by a processor, cause the processor to carry out the steps of:

- selecting a customer, one or more parameters based on which the SIM card profile shall be optimized, and one or more SIM card settings to be optimized;
- retrieving a list of identifiers, that uniquely identify SIM cards belonging to the selected customer from a subscriber database;
- retrieving SIM settings in accordance with the list of identifiers from a remote SIM provisioning platform, retrieve data comprising the selected one or more parameters for the SIM cards identified by the list from a network;
- forwarding the retrieved SIM settings and the data to an artificial intelligence system, receive optimized SIM settings from the artificial intelligence system; and
- instructing the remote SIM provisioning system to generate new SIM profiles based on the optimized SIM settings and to deploy the SIM profiles to the selected SIM cards.

SHORT DESCRIPTION OF THE DRAWINGS

Figure 1:
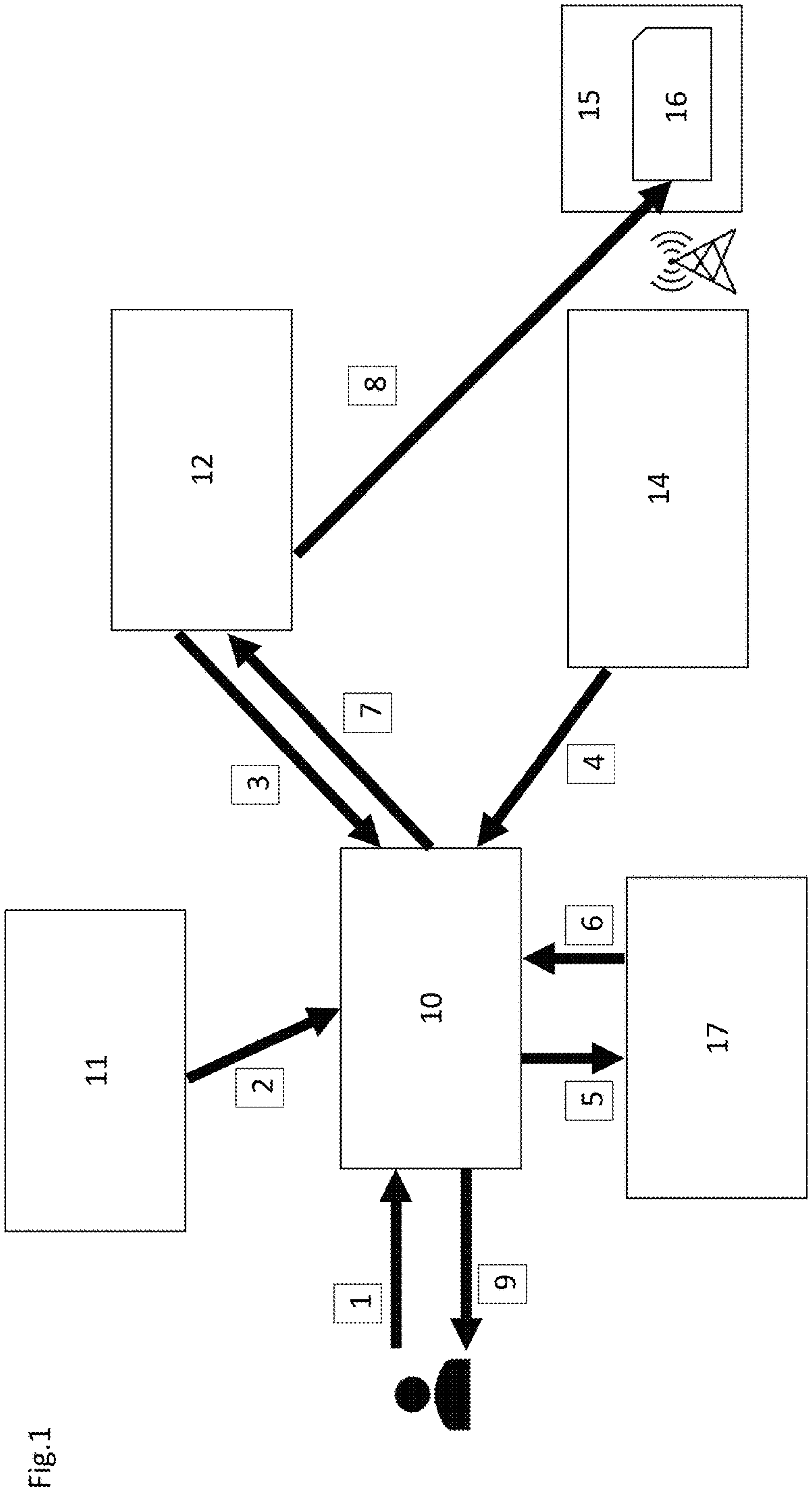
FIG. 1 is a schematic representation of a system in accordance with the invention.

FIG. 1 shows a network comprising a system 10 for optimizing SIM settings. The settings are part of a SIM profile. A terminal device 15 is, for example, a mobile device or an IoT device. For example, IoT devices are pieces of hardware, such as sensors, actuators, gadgets, appliances, or machines, that are programmed for certain applications and can transmit data over the internet or private networks. Terminal device 15 is, for example, a device comprising a SIM card 16, which must periodically provide a system status or update information. The device may comprise an eUICC (eSIM) instead of a common SIM card, which is a chip, pre-integrated in a device, for example during manufacturing. New SIM profiles may be deployed to an eUICC by means of a remote SIM provisioning platform (RSP).

The terminal device 15 is connected to a mobile core network 14. The terminal may be connected to a mobile core network via a radio access network, for example a 2G, 3G, 4G, 5G, narrowband IoT (NB-IoT), Cat-M1 or NTN network.

The network comprises a subscriber database 11, storing information of the customers and the related SIM cards. A subscriber database 11 may be a home location register (HLR) or a home subscriber server (HSS). The subscriber database is managed by a business sup-port system (BSS). The BSS allows to manage customer data, issue SIM cards, tariff and data plans. The BSS is accessible via an API. The system 10 may access the BSS via the API. The subscriber database may store information on customers and the SIM cards of the customer. The subscriber database may store a list of SIM cards belonging to the same customer. The system 10 accordingly may use the BSS to access the subscriber database.

The system 10 for optimizing SIM card settings may be called a SIM orchestrator (SO). The system 10 may comprise a configuration system. The configuration system may inter-act with a user. For example, the user may interact with the configuration system by using a client device. The client device may interact with the configuration system via an application programming interface (API). Accordingly, the client device may provide the user input to the system 10 via the API of the configuration system. The configuration system subsequently configures the system 10 in accordance with the user input.

The user may provide input to the configuration system. The user input may comprise instructions to select 1 one or more parameters based on which the one or more SIM settings shall be optimized. The parameter may be a key performance indicator. A key performance indicator may be a requirement for low-latency or the ratio of high bandwidth compared with the power efficiency or security or network friendliness. Network friendliness is specifically important for IoT use cases to not harm the network infrastructure by bad behaviour of poorly programmed devices in terms of efficient use of radio resources, compatibility with network protocols and secure default security settings, reliable handling of network and device errors (e.g. wrongly configured or designed devices can lead to network congestion after network failures), as there is no human user to stop or halt harmful device activity. The user may select 1 the SIM card settings to be optimized from a predetermined list. The predetermined list may include the files of the SIM profile, corresponding to the SIM settings. For example, the list may include $EF_{OPLMNwACT}$ Or $EF_{NETPAR}$ as specified in 3GPP TS 31.102 sections 4.2.53 or 4.2.57. For example, the setting can be any of the settings defined in section 4.2 of 3GPP TS 31.102.

The user may select 1 one or more SIM setting to optimize. The user may select the one or more SIM settings to optimize forming a list of SIM card settings. The SIM card settings may be network settings. The user may select 1 one or more parameters based on which of the one or more SIM setting shall be optimized. The user may select one or more parameters from a predefined list. For example, the parameters may be the number of successful network attach attempts, the number of failed network attach attempts, the number of successful attempts to open a data session, the number of failed network attempts to open a data session, the duration of data sessions, the number of data sessions with no payload transmitted or information on the radio access type used by the SIM card. The parameters may be the information which radio access network was used for a data session, for example the information which radio access network was used for a data session identifying a roaming partner providing the radio access network. The user may select 1 one or more customers. The user may select 1 that the SIM cards belonging to the one or more selected customers are optimized. The user may select that the SIM cards belonging to the one or more selected customers may be optimized with respect to the one or more selected parameters and/or the one or more selected SIM settings. Accordingly, the user may select that the one or more selected SIM settings are optimized based on the one or more selected parameters.

The system 10 may further comprise a data visualization unit. The data visualization unit may provide 9 visualized data to the user. The data visualization unit may provide 9 visualized data to a client device. The client device may display the data on a display. The data visualization system may visualize the configuration of the system 10. For example, the data visualization system may provide a visualized representation of the selected parameters and/or the selected SIM settings and/or the selected customer.

The system 10 may be configured to communicate with the subscriber database 11. The system may be configured by the configuration unit according to the user input.

The system may retrieve 2 a list of SIM identifiers (eID) from the subscriber database. The system may retrieve 2 a list of SIM identifiers (eID) from the subscriber database based on the configuration of the system 10. In particular, the system may retrieve 2 the list of SIM identifiers based on the user input. The system 10 may retrieve 2 a list of SIM cards that belong to a specific customer from the subscriber database 11. For example, the system 10 may retrieve the list based on user input, for example the user input may indicate a customer, to which a certain optimization task should be applied. The certain optimization task may be to optimize one or more SIM settings based on one or more parameters. The system 10 may communicate with the subscriber database using an API. The API may be part of a business support system (BSS) or an operating support system (OSS) running on the subscriber database 11.

In response to the request of the system to provide a list of SIM cards belonging to one or more specific customers, the subscriber database transmits 2 a list of SIM identifiers (eID) of SIM cards that belong to the specific one or more customers.

The system 10 is configured to communicate with a remote SIM provisioning platform (RSP) 12. The system may be configured to communicate with the RSP by the configuration unit and based on the user input received by the configuration unit. The remote SIM provisioning platform may be defined by GSMA SGP.21. The remote SIM provisioning platform may generate, personalize and deploy SIM profiles. For example, the remote SIM provisioning platform may deploy optimized eUICC profiles. The system retrieves 3 the SIM profiles corresponding to the SIM identifiers (eID) from the remote SIM provisioning platform 12. A SIM profile corresponds to the content stored in a SIM card. The SIM profile comprises the SIM settings, which are the specific settings for each profile. Each setting corresponds to a parameter. For example, the system 10 requests the SIM profiles for the list of eID retrieved from the subscriber database 11. Accordingly, the system retrieves 3 the SIM profiles for the SIM cards of the one or more selected customers. Therefore, the user configures the system to optimize the SIM card settings of the SIM cards of a specific customer. Accordingly, the system retrieves 3 the current setting for the SIM cards of the selected specific customer.

The system 10 is further configured to communicate with the mobile core network 14. In accordance with the selected one or more parameters and the list of SIM cards belonging to the one or more selected customers, the system retrieves 4 the selected parameters for the SIM cards belonging to the list from the core network. The configuration unit may con-figure the system 10 to retrieve 4 the selected parameters for the SIM cards belonging to a selected user, i.e. the SIM cards identified by the list. The configuration unit may configure the system based on the user input selecting the parameters, SIM settings and the customer. For example, the list may contain all eID for the SIM cards of one customer and the parameter may be the number of successful network attach attempts. In response to a request from the system 10, the network provides the parameter, e.g. the number of network attach attempts, for each of the SIM cards identified by an eID provided by the list.

The system 10 may be configured to provide 5 the parameter for each of the SIM cards identified by the eID of the list and to provide the list to an artificial intelligence system. The configuration unit may configure the system to communicate with the artificial intelligence system based on user input. In particular, the configuration unit may configure the system 10 to communicate with an artificial intelligence system trained for a use case corresponding to the selected parameters and/or SIM settings. The system may provide 5 the retrieved SIM profiles or SIM settings for each SIM card identified by the eID of the list to the artificial intelligence system 17. The artificial intelligence system 17 may be a machine learning system. The artificial intelligence system or machine learning system may be trained to optimize the SIM settings, in particular for each SIM card individually or for the group of selected SIM cards, based on the one or more parameters provided by the system. The machine learning system may be trained for a particular use case corresponding to a particular parameter, for example the number of network access attempts and a set of settings based on which the one or more parameters shall be optimized.

Accordingly, the artificial intelligence system may provide 6 optimized settings for each SIM card. The artificial intelligence or machine learning system 17 may provide only the selected one or more settings which shall be optimized.

The artificial intelligence system 17 may transmit or provide 6 the optimized SIM settings for each SIM card to the system 10. The system therefore allows the user to select one or more parameters and one or more settings, in particular for the selected customer. The system accordingly optimizes the settings with respect to the selected parameters. Accordingly, the optimized setting should result in optimizing the selected parameters. The artificial intelligence system 17 provides 6 the optimized settings to the system 10.

The system 10 receives the optimized SIM settings, i.e. the SIM settings that should result in the optimization of the selected one or more parameters, from the artificial intelligence system 17 and transmits 7 the new SIM settings for each of the identified SIM cards, corresponding to the eID of the list of SIM cards, to the remote SIM provisioning platform 12. The remote SIM provisioning system updates the SIM profiles based on the received SIM settings. The remote SIM provisioning system, in particular, updates the SIM profiles associated with the eID of the list of SIM cards, which belong to the selected customer.

The system 10 may order 7 the remote SIM provisioning system to roll out the optimized SIM profiles. The remote SIM provisioning platform either rolls out 8 the received SIM profile or generates new profiles based on the received SIM settings, for example by replacing the selected old values by the newly generated values, and rolls out or deploys 8 the newly generated SIM profiles to the corresponding SIM cards of the selected customer.

After the above process has been performed, the system may start again. Thereby the system 10 allows to iteratively optimize the SIM card settings of the SIM cards of a selected customer. Performing multiple optimization cycles will provide better settings which are periodically provided to the SIM cards. The system may measure the impact of the changes based on the selected parameter, i.e. by determining whether the parameter has improved in dependence with the optimized SIM settings.

Accordingly, the system perform the method for optimizing a SIM card profile.

In the following, an example of the invention will be discussed.

In the context of the Internet of Things (IoT), the aspect of power efficiency is of high importance, specifically for mobile devices running from battery power, that are supposed to operate for a long lifespan without the option to recharge (e.g. monitoring systems in remote areas). With optimized SIM settings on the eUICC, it is possible to minimize the power consumption used by a cellular modem. For global IoT use cases, the region/location of deployment, the available radio access types and network operators are usually not known at the time, the SIM profile is generated and therefore deployed settings lead to inefficiencies and may contribute to higher power consumption. For example, the following situations may contribute to increased power consumption:

- Failed attempts to use radio access types (2-5G, NB-IoT, Cat-M1, NTN), not available on the actual location of deployment.
- Scanning for networks on frequencies not in use in the actual location of deployment.
- Failed attempts to roam on networks with no contractual relationship with the home operator.
- Increased data retransmission by accidental attaching to one of multiple operators with lower quality at the given location.

The user may therefore select one or more of the above parameters. The parameters may therefore be key-performance indicators selected by the user. The user may provide 1 respective user input to the configuration unit to configure the system to perform the optimization based on the selected one or more parameters.

The user may also select a SIM setting which shall be optimized. For example, the success rate for the above cases are optimized by the following settings, which are elementary filed (EF) as defined in clause 4.2.53 of 3GPP TS 31.102: $EF_{OPLMNwACT}$ (operator controlled public land mobile network (PLMN) selector with access technology). 3GPP TS 31.102 defines the elementary files that each store a setting of a SIM profile. The SIM profile comprises the files corresponding to the settings and thereby comprises the SIM settings. Each of the elementary files corresponds to one particular SIM setting. The system optimizes the SIM settings by modifying the respective files. The SIM profile comprises all files related to the SIM settings. The $EF_{OPLMNwACT}$ contains the coding for n PLMNs, where n is determined by the operator. This information is determined by the operator and defines the preferred PLMNs in priority order. The first record indicates the highest priority and the $n^{th}$ record indicates the lowest priority. The EF also contains the access technologies for each PLMN in this list (see 3GPP TS 23.122). The system 10 of the invention is supposed to find the best possible order of PLMNs and access technologies to reduce the number of failed attempts when trying to attach to the network. As defined in 3GPP TS 31.102, the elementary filed $EF_{NETPAR}$ (Network Parameters) contain information concerning the cell frequencies. Network parameter storage may reduce the extent of the terminal search of FDD, TDD or GSM carriers when selecting a cell.

The user may further select a customer. The system retrieves the eIDs for the SIM cards of the customer. In particular, the system 10 retrieves the eID for the SIM cards of the customer from a subscriber database. Preferably, the system retrieves the eID for the SIM cards of the customer in form of a list. Subsequently, the system retrieves the current SIM profiles for the SIM cards of the customer from a remote SIM provisioning platform. The system 10 may provide the list of eIDs to the remote SIM provisioning system and requests the SIM profiles for the SIM cards identified by the eIDs of the list. The system may then retrieve one or more of the selected parameters from the core network, for example, the number of failed attempts to roam on networks with no contractual relationship with the home operator or the number of increased data retransmission by accidental attaching to one of multiple operators with lower quality at the given location for each of the SIM cards identified by the list of eIDs. The system may also retrieve the information about successful network connections and the parameters used by the SIM cards identified by the eID. The system will provide the retrieved information on the selected one or more parameters for each of the SIM cards identified by the eID and the SIM profiles for each of the identified SIM cards to a machine learning system.

The machine learning system 17 has been trained for the use case, i.e. the selected combination of one or more SIM settings and of one or more parameters. For example, the selected setting may be the $EF_{OPLMNWACT}$. The machine learning system may be trained to find the best possible order of PLMNs and access technologies to reduce the number of failed attempts when trying to reach the network. The system subsequently receives optimized SIM profiles comprising an optimized $EF_{OPLMNWACT}$, based on which the selected parameter should be optimized.

In another example, the selected SIM setting may be the $EF_{NETPAR}$. Based on the parameters retrieved from the core network, the machine learning system determines the most available frequencies in the used area to reduce length of network scans performed to find available networks and provides an optimized $EF_{NETPAR}$. The machine learning system then provides the $EF_{NETPAR}$ to the system, which modifies the SIM profile by replacing the current $EF_{NETPAR}$ with the optimized $EF_{NETPAR}$. The system then provides the optimized SIM profiles to the remote SIM provisioning system and instructs the remote SIM provisioning platform to deploy the new profiles.

The invention relates to M2M eUICC Technology:

1. M2M eUICC Technology

Figure 2:
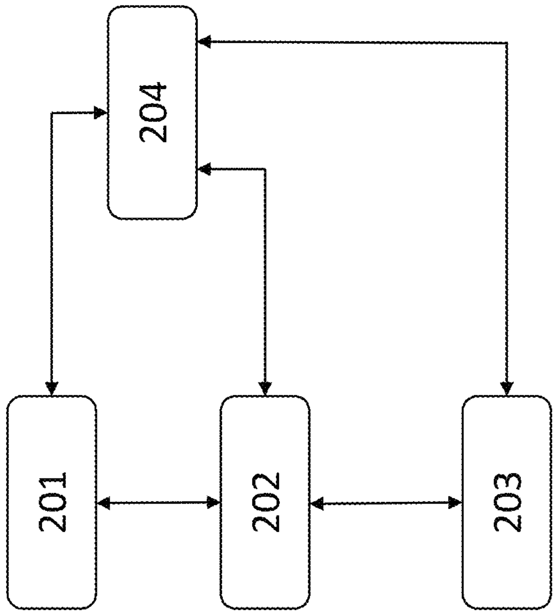
FIG. 2 is a schematic representation of a process providing a SIM profile to an eUICC
Figure 3:
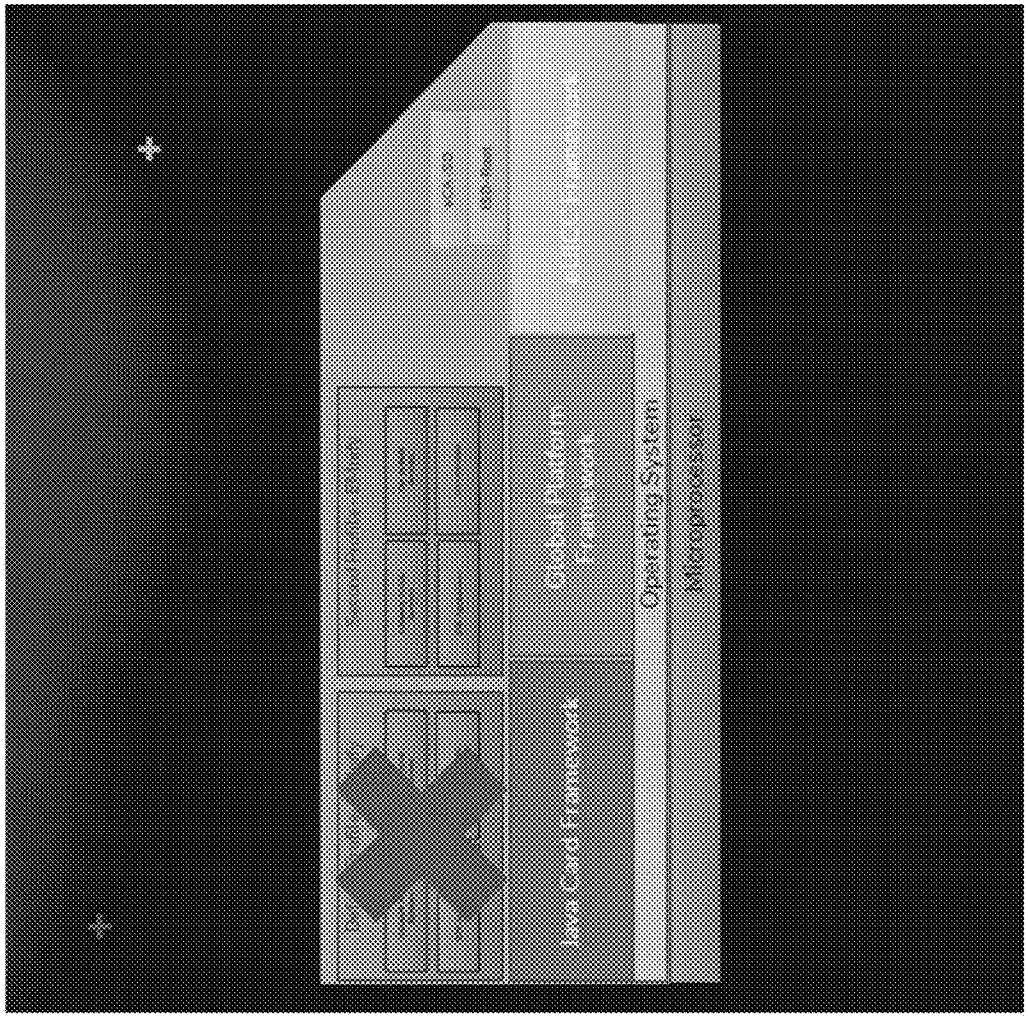
FIG. 3 is a graphical representation of a SIM card and schematically shows the replacement of a SIM profile with a SIM profile optimized by the system for optimizing a SIM profile.

For the purpose of this description, we refer to the subsequent FIG. 2.

eUICC technology enables compatible devices to be provided via an over the air (HTTPS) download with Operators' Profiles (Cellular Plans), replacing the default one, defined as Bootstrap Profile, stored in the eUICC 203 during the manufacturing process.

Defined by GSMA standard SGP.01 and SGP.02

4 main components

Mobile Operator—EMnify 204

SM-DP 201 for secure storage of Operators' Profiles which is part of a remote SIM provisioning system SM-SR 202 for secure download of profiles which is part of the remote SIM provisioning system eUICC—Customers' devices 203

2. Current Process

We refer to FIG. 2.

Phase 1—Default Profile eUICC 203 manufactured with default Operator Profile Deployed in the market Starting operate within customers' devices Phase 2—Second Operational Profile SM-DP 201 provider.

To develop it To store in volumes on SM-DP 201, based on Purchase Order from EMnify 204.

Each profile with its own ICCID/IMSI

EMnify 204

To associate each profile to a deployed eUICC 203

To trigger an over the air download and activation campaign

3. EMnify Custom Profiles

Phase 2—Option 1

Customer-related KPI collected by EMnify 204 infrastructure.

Customer-specific profile automatically generated by EMnify 204 based on collected data.

On-the-fly profile provisioning on the SM-DP 201 by EMnify 204, via NEW specific API Automatic association to customer deployed eUICCs 203.

Automatic over-the-air campaign to download and activate them Phase 2

Option 2.

New profile creation dashboard developed by EMnify 204

Specific customers allowed to create their own specific profile.

On-the-fly profile provisioning on the SM-DP 201 by EMnify, via NEW specific API Automatic association to customer deployed eUICC 203.

Automatic over-the-air campaign to download and activate them

The invention also relates to a method for establishing and activating a campaign, containing the steps of collecting, by EMnify infrastructure 204, customer-related KPI, automatically generating, by EMnify, customer-specific profile based on collected data, provision on the SM-DP 201 by EMnify, via NEW specific API, on-the-fly profile, automatic association to customer deployed eUICCs 203, providing the automatic campaign to download and activate them.

The invention further relates to a method for providing an automatic campaign, providing the steps of assessing the new profiled creation dashboard developed by EMnify 204, allowing specific customers to create their own specific profile, provisioning on-the-fly profile on the SM-DP 201 by EMnify, via new specific API, automatic association to customer deployed eUICC 203, and providing automatic over-the-air campaign to download and active them.

The invention claimed is:

1. A system for optimizing a SIM card profile, wherein the system comprises:

a configuration unit, configured to receive user input, and configure the system to optimize one or more parameters, a logic executor unit, wherein the logic executor is configured to communicate with a subscriber database, a remote SIM provisioning platform, a mobile core network, and an artificial intelligence system;

wherein the configuration unit configures the logic executor unit to:

selecting a customer, one or more parameters based on which the SIM card profile shall be optimized, and one or more SIM card settings to be optimized;

retrieve a list of identifiers, that uniquely identify SIM cards belonging to the selected customer, from a subscriber database;

retrieve SIM settings in accordance with the list of identifiers from a remote SIM provisioning platform;

retrieve data comprising the selected parameter for the SIM cards identified by the list from a network;

forward the retrieved SIM settings and the data to an artificial intelligence system;

receive optimized SIM settings from the artificial intelligence system;

instruct the remote SIM provisioning system to generate new SIM profiles based on the optimized SIM settings and to deploy the SIM profiles.

2. The system of claim 1, wherein the logic executor unit communicates with the subscriber database via an API of a business support system (BSS) or operating support system (OSS), wherein the logic executor unit communicates with the remote SIM provisioning system via an API, wherein the logic executor unit communicates with the core network via an API, and wherein the logic executor unit communicates with the artificial intelligence system via an API.

3. The system of claim 1, wherein the system comprises the artificial intelligence system.

4. The system of claim 1, wherein the artificial intelligence system is a machine learning system configured to optimize the selected one or more parameters, in particular wherein the artificial machine learning system is a statistical model.

5. The system of claim 1, wherein the artificial intelligence system is trained for the selected one or more parameters and one or more selected SIM settings.

6. The system of claim 1, wherein the artificial intelligence system is configured based on user input received at the configuration unit of the system.

7. The system of claim 1, wherein the system further comprises a data visualization unit, wherein the data visualization unit provides visualized data to the user, wherein the visualized data comprises information on the selected parameters and/or the customer and/or the selected SIM settings; the visualized data may further comprise the list of SIM cards belonging to the customer.

8. The system of claim 7, wherein the data visualization unit provides visualized data to a client device, comprising a graphical user interface for displaying the visualized data to the user, in particular, allowing the user to inspect the changes performed on the SIM card content via the graphical user interface.

9. A method for optimizing a SIM card profile, comprising the steps of:

selecting a customer, one or more parameters based on which the SIM card profile shall be optimized, and one or more SIM card settings to be optimized;

retrieving a list of identifiers, that uniquely identify SIM cards belonging to the selected customer, from a subscriber database;

retrieving SIM settings in accordance with the list of identifiers from a remote SIM provisioning platform; retrieving data comprising the selected one or more parameters for the SIM cards identified by the list from a network;

forwarding the retrieved SIM settings and the data to an artificial intelligence system;

receiving optimized SIM settings from the artificial intelligence system;

instructing the remote SIM provisioning system to generate new SIM profiles based on the optimized SIM settings and to deploy the SIM profiles to the selected SIM cards.

10. The method of claim 9, wherein the one or more parameters include a number of successful network access attempts, a number of failed network access attempts, a number of successful attempts to open a data session, a number of failed attempts to open a data session, the duration of a data session, the number of data sessions with no payload transmitted, information on the radio access type used, information which radio access network was used for a data session.

11. The method of claim 9, wherein the SIM card settings are network settings.

12. The method of claim 9, wherein the SIM card settings include the order of public land mobile networks or the most available frequencies in used area.

13. The method of claim 9, wherein the method is repeated multiple times, in particular, wherein the method runs in a permanent cycle.

14. The method of claim 9, wherein the method includes receiving an user input, specifying the customer and one or more parameters based on which the SIM card profile shall be optimized and one or more SIM card settings to be optimized.

15. The method of claim 9, wherein the user input is received by a configuration unit of a system for optimizing a SIM card profile and the method further comprises the step of configuring, by a configuration unit, the system for optimizing a SIM card profile based on the received user input.

* * * * *